(12) United States Patent
Schmidt et al.

(10) Patent No.: US 6,186,319 B1
(45) Date of Patent: Feb. 13, 2001

(54) DOUBLE VHS STORAGE CONTAINER

(75) Inventors: Gerhard T. Schmidt, Uniontown; Gale W. Essick, Minerva, both of OH (US)

(73) Assignee: Alpha Enterprises, Inc., North Canton, OH (US)

(*) Notice: Under 35 U.S.C. 154(b), the term of this patent shall be extended for 0 days.

(21) Appl. No.: 09/392,886

(22) Filed: Sep. 9, 1999

Related U.S. Application Data

(60) Provisional application No. 60/099,683, filed on Sep. 10, 1998.

(51) Int. Cl.[7] .................................................. B65D 85/672
(52) U.S. Cl. ...................................... 206/232; 206/387.13
(58) Field of Search .............................. 206/232, 308.1, 206/387.13, 450, 472, 748, 749, 315.11

(56) References Cited

U.S. PATENT DOCUMENTS

| | | | |
|---|---|---|---|
| 1,445,593 | * | 2/1923 | Iscowitz ............................ 206/472 |
| 3,487,919 | * | 1/1970 | Elliott et al. ...................... 206/472 |
| 3,540,576 | * | 11/1970 | Pierce et al. ..................... 206/749 |
| 3,948,579 | * | 4/1976 | Schirmer ........................ 206/315.11 |
| 4,789,061 | * | 12/1988 | Roze ................................ 206/387.13 |
| 4,823,950 | * | 4/1989 | Roze ................................. 206/472 |
| 4,848,585 | * | 7/1989 | Snyder .............................. 206/472 |
| 4,951,812 | * | 8/1990 | Chen ................................ 206/748 |
| 4,978,001 | * | 12/1990 | Nelson .............................. 206/748 |
| 4,998,616 | * | 3/1991 | Hillinger ........................... 206/748 |
| 5,775,500 | * | 7/1998 | Williams ........................ 206/387.13 |

* cited by examiner

Primary Examiner—Jim Foster
(74) Attorney, Agent, or Firm—Sand & Sebolt

(57) ABSTRACT

A double storage container for articles of recorded media includes a pair of storage containers that each have a base and a lid. The double storage container may be fabricated by connecting the bases together with connectors or welds. A common sheath is applied over both lids and the hinge to receive printed material.

7 Claims, 6 Drawing Sheets

DOUBLE VHS STORAGE CONTAINER

CROSS-REFERENCE TO RELATED APPLICATIONS

This Application claims priority from United States Provisional application Ser. No. 60/099,683 filed Sep. 10, 1998, the disclosures of which are incorporated herein by reference.

BACKGROUND OF THE INVENTION

1. Technical Field

The present invention is generally directed to storage containers for recorded media and, more particularly, to a storage container for holding a pair of video cassette tapes in a single storage container. Specifically, the present invention relates to a double video storage container and a method of creating the double video storage containers that allows a large quantity of the storage containers to be fabricated quickly using existing tooling.

2. Background Information

The movie Titanic was released in 1997 and immediately became an overwhelming success. The movie won multiple academy awards and is still enjoying a long run in the theaters almost a year after it initially opened. Eventually, the owners of the film will release it on video allowing people to buy and rent copies.

Although releases to video occur nearly every day, the release of a movie as popular as Titanic is expected to create a demand for the video that has never been before experienced in the industry. A problem in the release is expected because the length of the movie is over three hours. A movie of this length cannot fit on a single rental-quality VHS tape. The movie must thus be recorded on a pair of video tapes that must be rented together. Although each tape may be stored in its own storage container, video rental establishments prefer to use a container that holds both tapes so that the tapes do not become separated or mixed up. A common problem with two-video-cassette movies is that a customer unknowingly takes home two first half tapes, thus leaving another customer with two second half tapes.

Solutions to this problem have been developed in the prior art and include the double VHS storage container depicted in FIGS. 5 and 6 and indicated generally by the numeral 10. Such a double VHS storage container would function to meet the needs of the video rental establishments for the release of Titanic except that enough of the storage containers cannot be manufactured in time for the release. There is simply not enough time and not enough manufacturing capability to produce the number of containers needed for the release. It is thus desired in the art to provide a double video storage container that may be quickly assembled in large quantities to meet this huge demand.

SUMMARY OF THE INVENTION

In view of the foregoing, it is an objective of the present invention to provide a double video storage container capable of holding two video cassettes.

Another objective of the present invention is to provide a double video storage container having a separate lid and storage container for each video tape.

Yet another objective of the present invention is to provide a double video storage container that seals one storage chamber from the other storage chamber so that one tape may remain in a relatively sealed environment while the other tape is removed from the container.

Yet another objective of the present invention is to provide a double video storage container that may be fabricated from existing storage containers.

A further objective of the present invention is to provide a double video storage container that may be fabricated using existing machinery and molds.

An additional objective of the present invention is to provide a double video storage container that may be manufactured in large quantities in a relatively short amount of time.

Another objective of the present invention is to provide a double video storage container that is of simple construction, that achieves the stated objectives in a simple, effective and inexpensive manner, and that solves the problems and which satisfies the needs existing in the art.

These and other objectives and advantages of the invention are achieved by a storage container for recorded media, the general nature of which may be stated as including a first base having a plurality of walls and a first lid hingedly connected to the first base; the first lid selectively movable between open and closed positions; the first base having a first storage chamber; a second base having a plurality of walls and a second lid hingedly connected to the second base; the second lid selectively movable between open and closed positions; the second base having a second storage chamber; the bases connected together; and at least one wall being disposed between the first and second storage chambers.

Other objectives and advantages of the invention are achieved by a method for fabricating a storage container adapted to hold first and second items of recorded media including the steps of providing a first storage container with a base and a lid connected to the base with a hinge; providing a second storage container with a base and a lid connected to the base with a hinge; and connecting the bases together.

BRIEF DESCRIPTION OF THE DRAWINGS

The preferred embodiment of the invention, illustrative of the best mode in which applicant contemplated applying the principles, is set forth in the following description and is shown in the drawings and is particularly and distinctly pointed out and set forth in the appended claims.

Similar numbers refer to similar parts throughout the specification.

DESCRIPTION OF THE PREFERRED EMBODIMENTS

Figure 5:
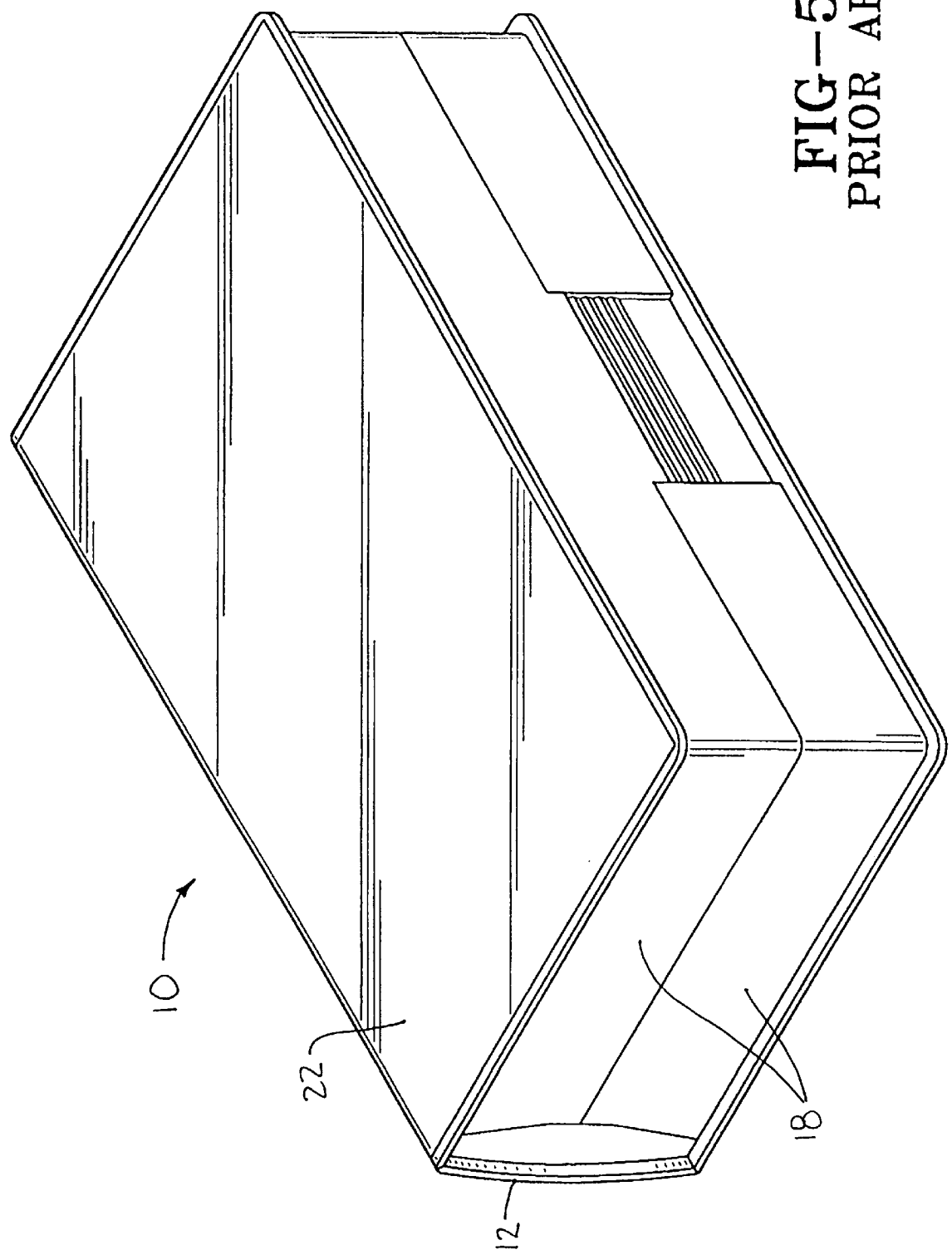
FIG. 5 is a perspective view of a prior art double video storage container.
Figure 6:
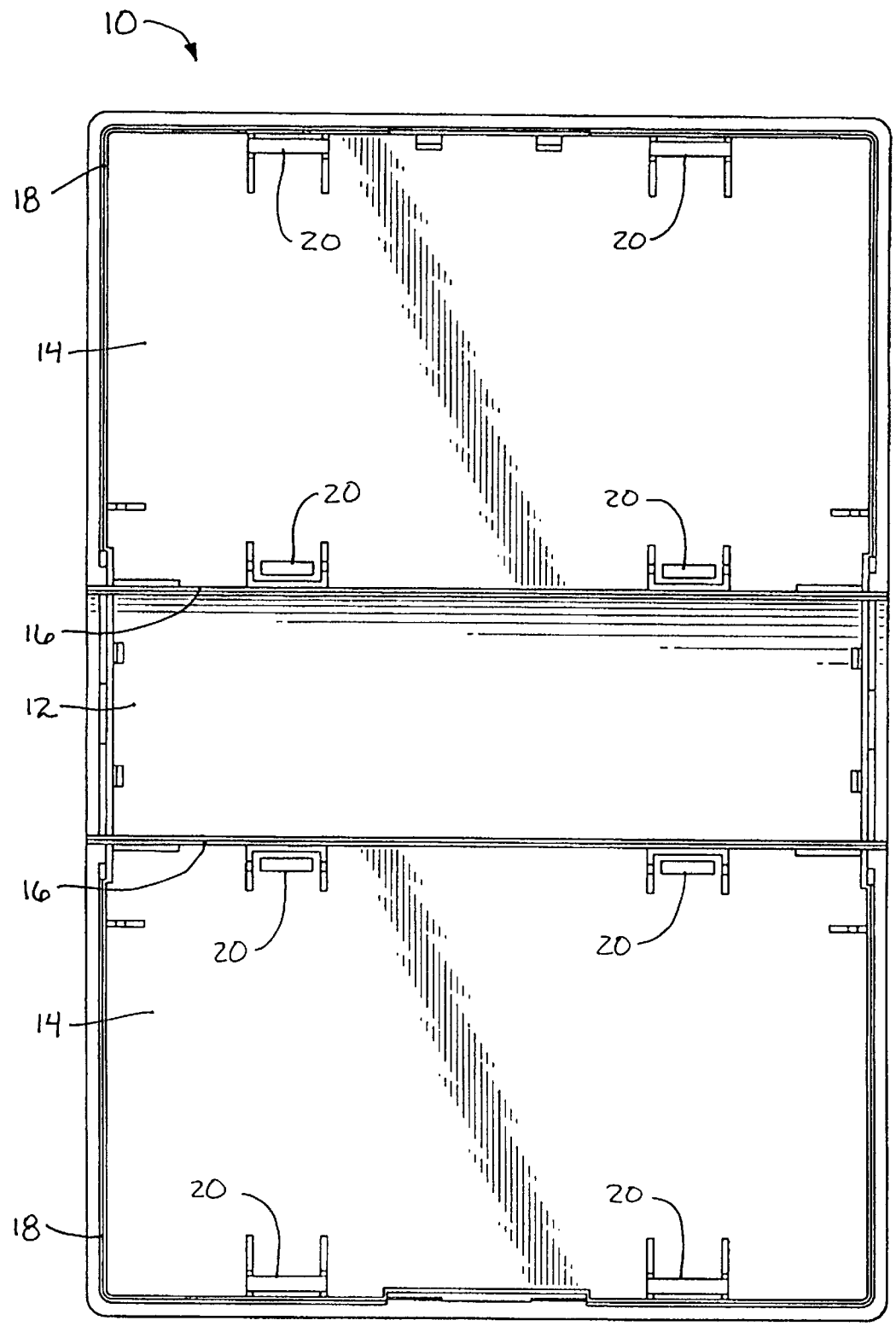
FIG. 6 is a top view of the prior art video storage container of FIG. 5 in an open position.

As discussed in the Background of the Invention section of this specification, a prior art double video storage container is depicted in FIGS. 5 and 6 and is indicated generally by the numeral 10. Prior art container 10 includes a spine 12 to which a pair of base members 14 are hingedly connected by continuous hinges 16. A side wall 18 projects upwardly from each base 14 and extends about 3 of the 4 sides base 14. Side walls 18 are adapted to cooperate to form a closed chamber along with bases 14 and spine 12 when container 10 is in the closed position. Each base supports a plurality of clips 20 that are adapted to securely hold a typical video cassette. Container 10 thus maintains both video cassettes in a single chamber and exposes both video cassettes to the surrounding atmosphere when one tape is removed from the chamber. A flexible substantially transparent sheet 22 is provided on the backs of bases 14 and spine 12 to provide a location for holding literature promoting the contents of the storage container. Although storage container 10 is functional and suitable for its intended use, it cannot be manufactured in sufficient quantities to meet the expected demand for the release of the movie Titanic. Storage container 10 thus does not solve the immediate problem in the art.

A double video storage container according to the concepts of the present invention is depicted in FIGS. 1–4 and is indicated generally by the numeral 50. Storage container 50 is fabricated from a pair of storage containers 52 that are each adapted to hold a single video cassette. Storage containers 52 are capable of being manufactured in the quantities necessary to meet the expected demand for the movie release because the manufacturing lines and molds have already been set up. There are also large quantities of storage containers 52 on hand that may be used to fabricate double video storage container 50. An objective of the present invention is thus met by double video storage container 50 because it can be fabricated in sufficient quantities to meet 20 the demand for the movie release.

Each storage container 52 is adapted to hold a single video cassette in a chamber 54. As such, each container 52 includes a base 56, a side wall 58, and a lid 60 that is hingedly connected to one portion of side wall 58. Lid 60 is adapted to cooperate with side wall 58 to maintain container 52 in a closed position.

In the embodiment of the invention depicted in the drawings, each lid 60 carries a pair of hubs 62 that are adapted to receive a typical video cassette. As may be seen in FIG. 4, each lid 60 is sized and adapted to seat a video cassette 64 so that cassette 64 may be easily removed from storage container 50 when lid 60 is in the open position. In other embodiments of the present invention hub 62 may be disposed on base 56.

Figure 1:
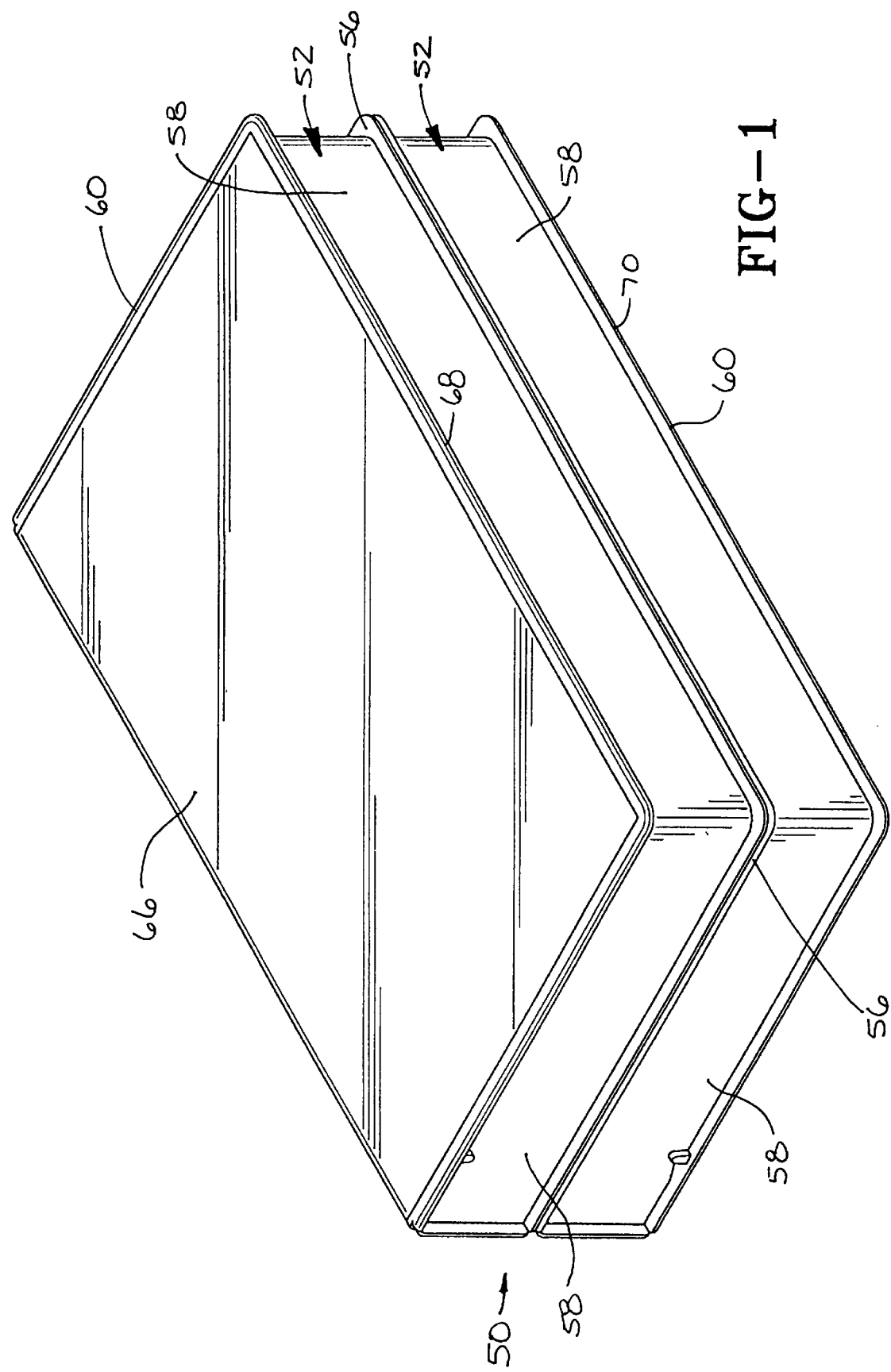
FIG. 1 is a perspective view of the double video storage container of the present invention in a closed configuration.
Figure 2:
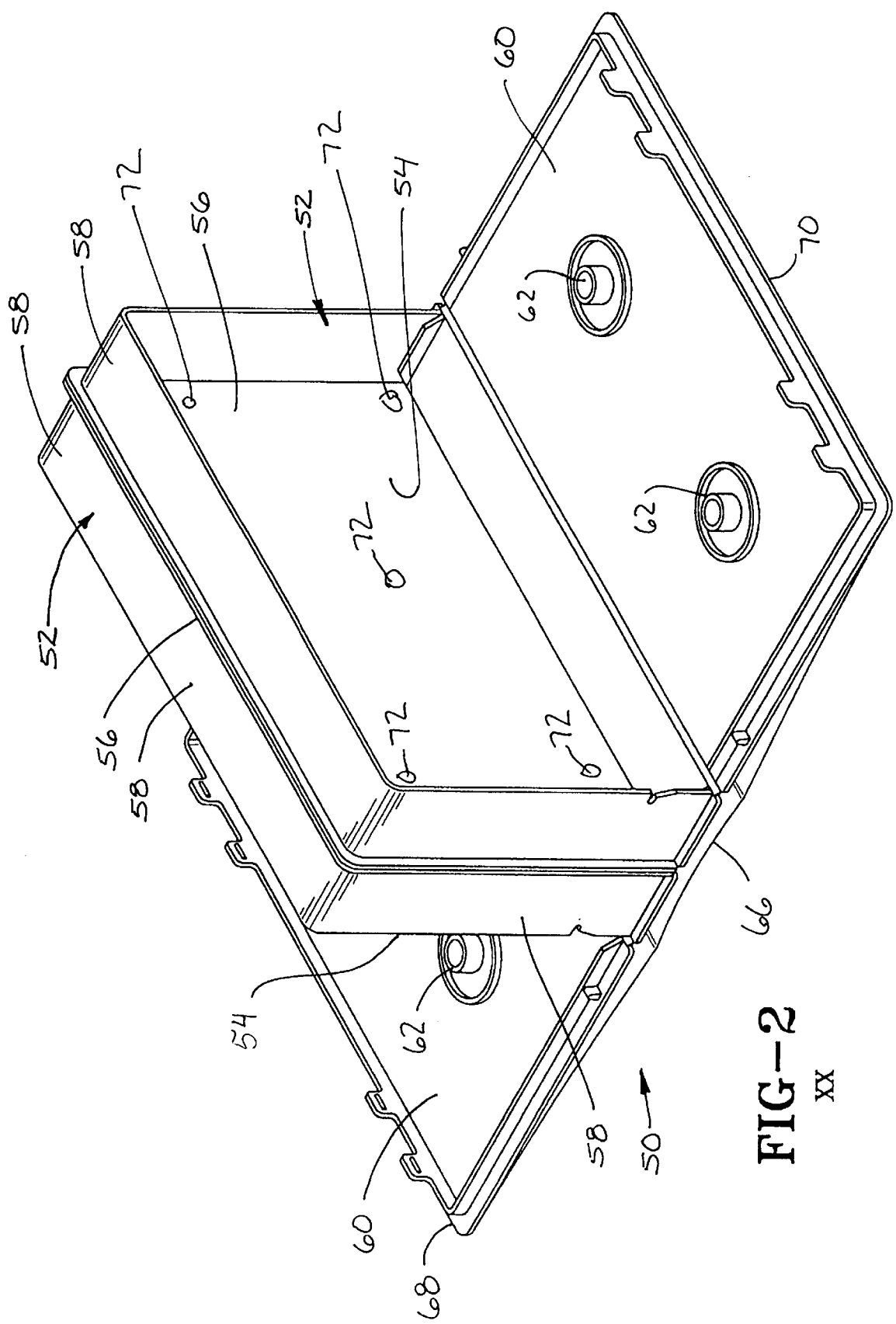
FIG. 2 is a perspective view of the double video storage container of the present invention in an open configuration.
Figure 3:
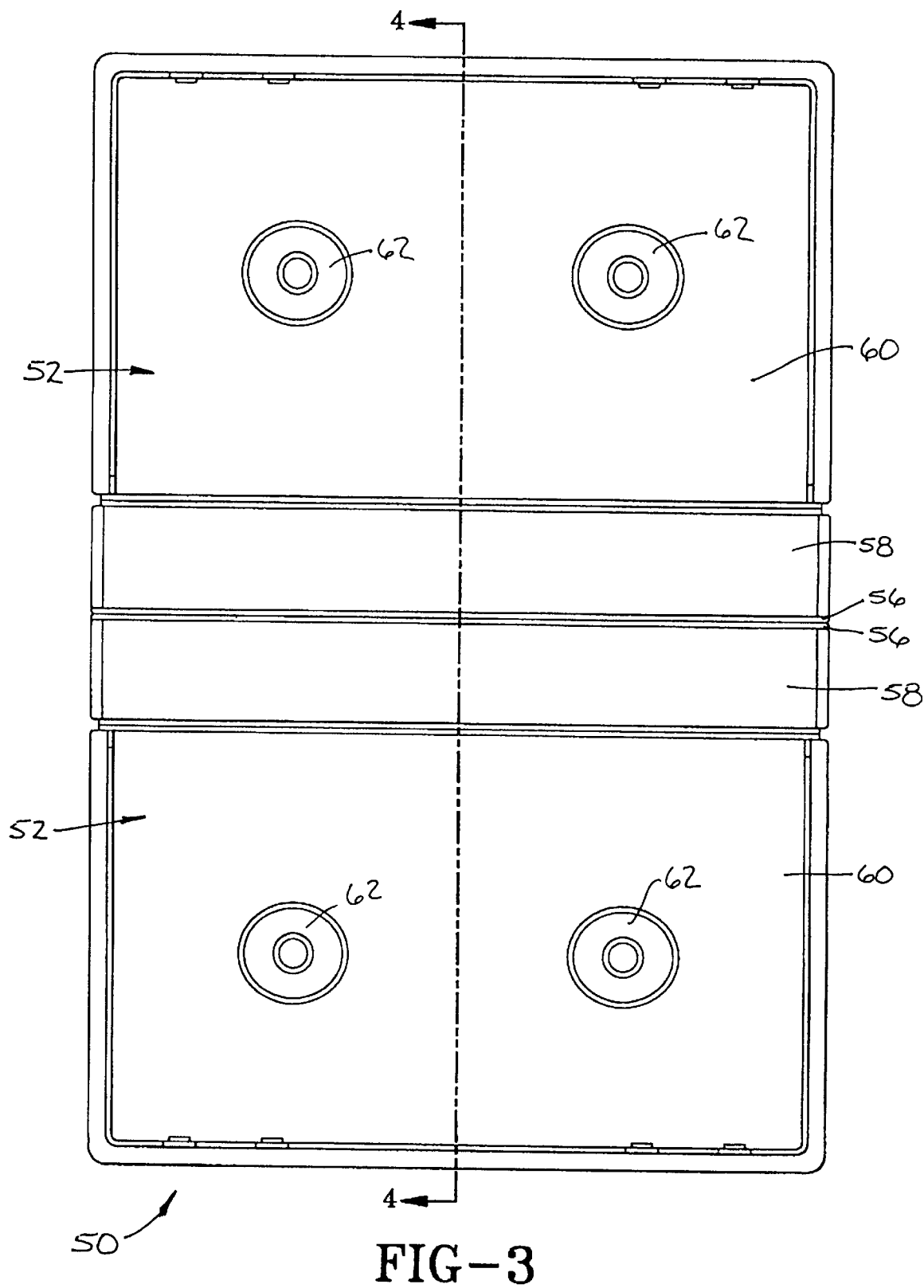
FIG. 3 is a top plan view of the storage container in the open configuration.
Figure 4:
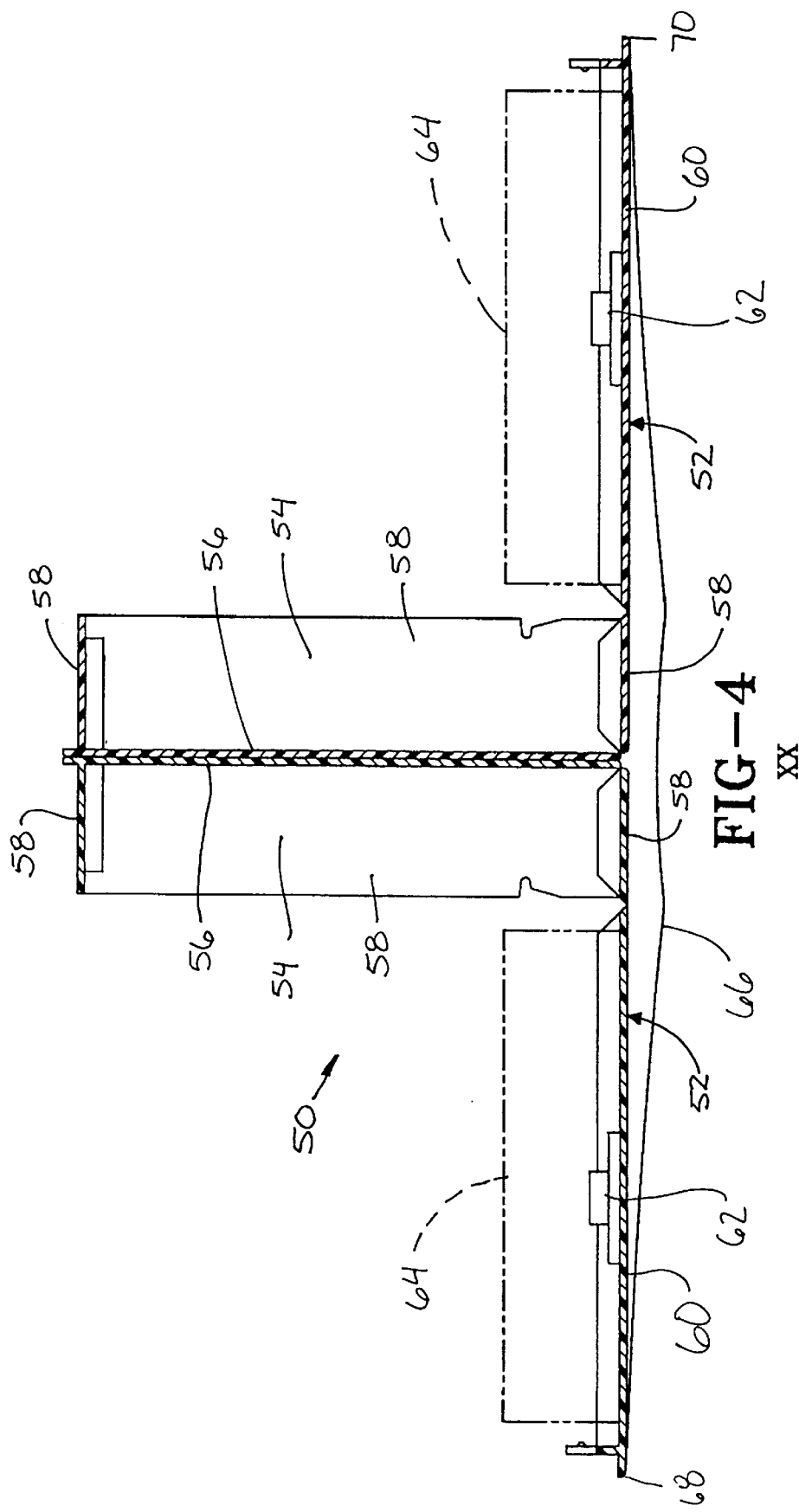
FIG. 4 is a sectional view taken along line 4—4 of FIG. 3.

Storage container 50 further includes a substantially transparent, flexible sheath 66 that extends from the outer edge 68 of one lid 60 entirely across one lid 60, side walls 58 and the other lid 62, the other outer edge 70 of the other lid 60. Transparent sheath 66 is sized to be held snugly against storage container 50 when lids 60 are in their closed positions as depicted in FIG. 1. This dimension causes sheath 66 to slack away from storage container 50 when both lids 60 are in the open position as depicted in FIGS. 2 and 4. Literature (not shown) may thus be inserted between sheath 66 and lids 60 and side walls 58 where the literature may be held in place and viewed through transparent sheath 66.

Storage containers 52 are held together by a suitable connector that substantially permanently connects one storage container 52 to the other storage container 52 to form double video storage container 50 of the present invention. In the preferred embodiment of the present invention, a plurality of ultrasonic welds 72 are used to secure one base 56 to the other base 56. Welds 72 are created by known methods and function to secure bases 56 together in a secure manner. Although storage containers 52 are typically fabricated from a plastic that is difficult to match with adhesives, some adhesives known in the art may function to bond based 56 together. It is, however, desired that the bond be strong enough to maintain the connection between bases 56 during the normal wear and tear associated with video rental tapes. Other manners of joining bases 56 are also contemplated by the present invention, including using physical fasteners such as rivets, screws, nails, or clips. Ultrasonic welds 72 have been found to be one of the best manners of connected storage containers 52 to provide a strong, durable double video storage container 50. Double video storage container 50 has the advantage over prior art double video storage containers such as the embodiment depicted in FIG. 5 in that it may be quickly produced in large quantities to meet the demand for the upcoming movie release. Storage container 50 also has the benefit that one video tape may remain in a closed storage container while the other video tape is being removed from and replaced into storage container 50 so that the video cassette remaining in the closed container experiences as little exposure to the surrounding atmosphere as possible during its rental life. Such limited exposure should help to extend the rental life of the video cassette.

Accordingly, the improved double video storage container apparatus is simplified, provides an effective, safe, inexpensive, and efficient device that achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the double video storage container is constructed and used, the characteristics of the construction, and the advantageous new and useful results obtained; the new and useful structures, devices, elements, arrangements, parts, and combinations are set forth in the appended claims.

What is claimed is:

1. A storage container for recorded media comprising:
   a first container having a base, a side wall, and a first lid hingedly connected to the side wall of the first container;
   the first lid selectively movable between open and closed positions;
   the first container having a first storage chamber;
   a second container formed separate from the first container; the second container having a base, a side wall, and a second lid hingedly connected to the side wall of the second container;
   the second lid selectively movable between open and closed positions;
   the second container having a second storage chamber;
   the containers being connected together by connectors holding the bases together; the bases being fixed together by the connectors;
   the base wall of the first container and the base wall of the second container being disposed between the first and second storage chamber; and a sheath connected to the first lid and the second lid; the sheath extending across both lids; the sheath adapted to hold literature between the sheath and the containers.

2. The container of claim 1, wherein the hinges are adjacent to one another.

3. The container of claim 1, wherein the containers are connected with welds.

4. The container of claim 3, wherein the welds are ultrasonic welds.

5. A storage container for recorded media comprising:

a first VHS storage container having a base, a side wall, and a lid; the lid being connected to the side wall with a first hinge and moveable between open and closed positions;

a second VHS storage container having a base, a side wall, and a lid; the lid being connected to the side wall with a second hinge and moveable between open and closed position;

each VHS storage container including means for holding a VHS cassette tape;

the bases of the containers being welded together so that the lids open away from each other; and a sheath connected to the first lid and the second lid; the sheath being connected to the lids opposite the hinges; the sheath extending across both lids and over the hinges; the sheath adapted to hold literature between the sheath and the containers.

6. A method for fabricating a storage container adapted to hold first and second items of recorded media; the method comprising the steps of:

providing a first separately-formed storage container with a base and a lid connected to the base with a hinge;

providing a second separately-formed storage container with a base and a lid connected to the base with a hinge;

connecting the bases together to form a single storage container;

providing a sheath; and connecting the sheath to the first lid and the second lid after the bases are connected to allow literature to be held between the sheath and the containers.

7. The method of claim 6, wherein the step of connecting the bases together includes the step of welding the bases together.

\* \* \* \* \*